United States Patent
Engström et al.

(10) Patent No.: US 9,204,290 B2
(45) Date of Patent: Dec. 1, 2015

(54) METHOD AND SYSTEM FOR CONSTRUCTING A DOMAIN NAME FOR A RADIO NETWORK NODE IN A CELLULAR COMMUNICATION SYSTEM

(75) Inventors: Stefan Engström, Linköping (SE); Fredrik Gunnarsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 778 days.

(21) Appl. No.: 13/164,458

(22) Filed: Jun. 20, 2011

(65) Prior Publication Data

US 2012/0106468 A1 May 3, 2012

Related U.S. Application Data

(60) Provisional application No. 61/409,751, filed on Nov. 3, 2010.

(51) Int. Cl.
*H04W 8/24* (2009.01)
*H04L 29/12* (2006.01)
*H04B 7/155* (2006.01)
*H04W 84/04* (2009.01)
*H04W 88/04* (2009.01)

(52) U.S. Cl.
CPC ......... *H04W 8/245* (2013.01); *H04L 29/12669* (2013.01); *H04L 29/12905* (2013.01); *H04L 61/30* (2013.01); *H04L 61/304* (2013.01); *H04L 61/6054* (2013.01); *H04B 7/155* (2013.01); *H04W 84/047* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2009/0176496 A1* | 7/2009 | Li et al. | 455/437 |
| 2009/0268635 A1* | 10/2009 | Gallagher et al. | 370/254 |
| 2009/0268722 A1* | 10/2009 | Gallagher et al. | 370/352 |
| 2009/0270097 A1* | 10/2009 | Gallagher et al. | 455/435.1 |
| 2009/0270098 A1* | 10/2009 | Gallagher et al. | 455/435.1 |

(Continued)

FOREIGN PATENT DOCUMENTS

| | | |
|---|---|---|
| CN | 101436981 | 5/2009 |
| JP | 2009-510971 | 3/2009 |
| WO | WO 2010048571 A1 * | 4/2010 |

OTHER PUBLICATIONS

"3rd Generation Partnership Project; Technical Specification Group Core Network and Terminals; Numbering, addressing and identification (Release 9)", 3GPP TS 23.003 V9.4.0 (Sep. 2010).*

(Continued)

*Primary Examiner* — Phirin Sam
*Assistant Examiner* — Faiyazkhan Ghafoerkhan
(74) *Attorney, Agent, or Firm* — Baker Botts, LLP

(57) ABSTRACT

A domain name associated with a radio network node's operator or maintenance (OM) node is determined based on at least part of a radio node identifier and a radio network operator identifier. The radio network node sends the domain name to a domain name server. In response to sending the constructed domain name, the radio network node receives from the domain server an IP address for the OM node. The radio network node then initiates a connection with the OM node using the IP address. In one non-limiting example embodiment, the part of the radio node identifier is a radio network node vendor identifier.

26 Claims, 8 Drawing Sheets

(56) References Cited

U.S. PATENT DOCUMENTS

| | | | | |
|---|---|---|---|---|
| 2009/0270099 | A1* | 10/2009 | Gallagher et al. | 455/435.1 |
| 2010/0008254 | A1* | 1/2010 | Schneyer et al. | 370/254 |
| 2010/0009681 | A1* | 1/2010 | Schneyer et al. | 455/435.1 |
| 2010/0037045 | A1* | 2/2010 | Schneyer et al. | 713/150 |
| 2010/0039991 | A1* | 2/2010 | Godin et al. | 370/328 |
| 2010/0054132 | A1* | 3/2010 | Mitsumori | 370/236.2 |
| 2010/0103845 | A1* | 4/2010 | Ulupinar et al. | 370/254 |
| 2010/0103857 | A1* | 4/2010 | Ulupinar et al. | 370/313 |
| 2010/0103862 | A1* | 4/2010 | Ulupinar et al. | 370/315 |
| 2010/0260098 | A1* | 10/2010 | Ulupinar et al. | 370/315 |
| 2010/0260109 | A1* | 10/2010 | Ulupinar et al. | 370/328 |
| 2010/0322148 | A1* | 12/2010 | Liu et al. | 370/315 |
| 2011/0244851 | A1* | 10/2011 | Gunnarsson et al. | 455/423 |
| 2011/0249610 | A1* | 10/2011 | Ho et al. | 370/315 |
| 2011/0287740 | A1* | 11/2011 | Vos et al. | 455/410 |
| 2012/0044836 | A1* | 2/2012 | Sivavakeesar et al. | 370/255 |
| 2012/0071085 | A1* | 3/2012 | Gunnarsson et al. | 455/7 |

OTHER PUBLICATIONS

International Search Report and Written Opinion mailed Mar. 8, 2012 in International Application No. PCT/SE2011/051051.
Qualcomm Incorporated: "Startup Procedure for Relay Nodes", 3GPP Draft; R3-101944, $3^{rd}$ Generation Partnership Project (3GPP), vol. RAN WG3, No. 23 Jun. 2010, XP050453855, paragraph [0002].
"$3^{rd}$ Generation Partnership Project; Technical Specification Group Core network and Terminals; Numbering, addressing and identification (Release 9)", 3GPP Standard; 3GPP TS 23.003, $3^{rd}$ Generation Partnership Project (3GPP), No. V9.4.0, Sep. 21, 2010, pp. 1-76, XP050442102.
Ericsson: "DNS Procedure for Relay Node OAM System Discovery" 3GPP Draft; Draft CR-29.303, $3^{rd}$ Generation Partnership Project (3GPP), vol. RAN WG3, Jan. 11, 2011, XP050497085.
Ericsson: "DNS Procedure for Relay Node OAM System Discovery" 3GPP Draft; Draft CR-29.303, $3^{rd}$ Generation Partnership Project (3GPP), vol. RAN WG3, Jan. 11, 2011, XP050474279.
Ericsson et al.: "DNS Procedure for Relay Node OAM System Discovery", 3GPP Draft; C4-110216-29.303_PA2, $3^{rd}$ Generation Partnership Project (3GPP), vol. CT WG4, Jan. 14, 2011, XP050483987.
Ericsson et al.: "DNS Procedure for Relay Node OAM System Discovery", 3GPP Draft; C4-110280WAS216-29.303_PA2; vol. CT WG4, Jan. 28, 2011, XP050484051.
Ericsson et al.: "DNS Procedure for Relay Node OAM System Discovery", 3GPP Draft; C4-110419WAS396WAS280WAS216-29.303_PA4, $3^{rd}$ Generation Partnership Project (3GPP), vol. CT WG4, Jan. 30, 2011, XP050484169.
Stuart Cheshire Marc Krochmal Apple Computer et al., "DNS-Based Service Discovery; draft-cheshire-dnsext-dns-sd-04.txt", 20060810, No. 4, XP015046478.
3GPP TS 23.003 V9.4.0 (Sep. 2010), Technical Specification Group Core Network and Terminals; Numbering, addressing and Identification (Release 9), 76 pages.
3GPP TS 29.303 V9.2.0 (Sep. 2010), Technical Specification Group Core Network and Terminals; Domain Name System Procedures (Release 9), 51 pages.
Written Opinion of the International Preliminary Examining Authority mailed Dec. 21, 2012 in PCT/SE2011/051051.
EPO Communication pursuant to Article 94(3) EPC for Application No. 11 799 192.7-1505, Oct. 31, 2014.
3rd Generation Partnership Project; Technical Specification Group Core Network and Terminals; Characteristics of the Universal Subscriber Identity Module (USIM) application (Release 9), 2010.
3rd Generation Partnership Project; Technical Specification Group Core Network and Terminals; Numbering, addressing and identification (Release 9), 2010.
3rd Generation Partnership Project; Technical Specification Core Network and Terminals; Domain Name System Procedures; Stage 3 (Release 9), 2010.
Japanese issued Notice of Ground for Rejection for Patent Application No. 2013/537636.
3GPP TSG-RAN WG3 #69bis Meeting; Xi'an, China; Title: Discussion on OAM architecture (R3-102759).
Search Report issued by the State Intellectual Property office of People's Republic China for Application No. 201180053165.X.

* cited by examiner

METHOD AND SYSTEM FOR CONSTRUCTING A DOMAIN NAME FOR A RADIO NETWORK NODE IN A CELLULAR COMMUNICATION SYSTEM

PRIORITY APPLICATION

This application claims priority from U.S. provisional patent application No. 61/409,751, filed on Nov. 3, 2010, the contents of which are incorporated herein by reference.

TECHNICAL FIELD

The technology describes O&M system discovery by one or more radio network nodes in a radio communications system.

INTRODUCTION

Cellular mobile radio communication systems are introducing Relay Nodes (RN) which, like Radio Base Stations (RBSs), serve mobile stations (MS) with a radio connection in a geographic area (e.g., a cell). A relay node typically uses the same type of radio connection for its own backhaul communication on the same or different frequency than used for communicating with the MSs. The base station to which the relay node's backhaul communication is transmitted is called a Donor Node (DN).

A relay node usually performs control functions to handle its own radio network management. When a relay node is installed, it needs to receive configuration information so that it can become properly configured for operation in the system. Today, that configuration is provided mainly from a operations and maintenance (O&M) system node, though some of the backhaul radio configuration may be provided from the donor node (DN). To get the configuration information from the O&M system, a relay node needs to find its proper O&M system node and connect to it. The network address (e.g., IP address) to that O&M node can be provided either by pre-configuration in the relay node or by a Subscriber Identity Module (SIM) card associated with the relay node before installation or provided in the relay node at installation. The address to the O&M node can also be received as a boot server address from a Dynamic Host Configuration Protocol (DHCP) server.

Another technical area relevant to the technology in this application is idle mode mobility management in cellular networks. Each base station covers a geographical area, and a set of base stations cover a wider geographical area identified by an area identifier, typically broadcasted by each base station in the set. When an idle mobile radio station moves, it checks the broadcasted area identifier, and if it is different from that of the previous base station, then the mobile notifies the cellular system via an area update procedure. In this way, the approximate location of the mobile station is known by the cellular system, which is useful for example when the system is trying to establish contact with the mobile station for an incoming call. Example area identifiers include tracking area identifiers in EUTRAN and location area identifiers and routing area identifiers in UTRAN and GSM.

Another technical area relevant to the technology in this application is fully qualified domain names (FQDNs). A FQDN is the complete domain name of a specific computer or host on a routed network such as the Internet. A domain name server can lookup the IP address of the host using the FQDN as a key. The FQDN is also used by the 3 rd Generation Partnership Project (3GPP) to specify complete domain names of specific hosts in the network of a radio communications network operator.

IP addresses of core network nodes can be recovered via communication with Domain Name Systems (DNS) using Fully Qualified Domain Names (FQDN) as keys. Example nomenclature for compiling domain names is described in 3 GPP TS 23.003 V9.4.0 "Numbering, addressing and identification," incorporated by reference. 3 GPP TS 29.303 V9.2.0 "Domain Name System Procedures," also incorporated by reference, provides details about DNS operations.

The International Mobile Subscriber Identity (IMSI) associated with a mobile subscriber may be used to recover a Mobile Country Code (MCC), which uniquely identifies the country of domicile of the mobile subscriber, and a Mobile Network Code (MNC), which identifies the radio network operator within the country. Consider the following first example for obtaining an IP Multimedia Subsystem (IMS) Home Network Domain Name from Section 13.2 of 3 GPP TS 23.003 V9.4.0. For 3 GPP systems, the user equipment (UE) derives its home network domain name from the IMSI for the mobile subscriber as described in the following steps:

1. Depending on whether a 2 or 3 digit MNC is used (see 3 GPP TS 31.102), separate the first 5 or 6 digits of the IMSI into MCC and MNC. If the MNC is 2 digits, then a zero is added at the beginning of the MNC.
2. Use the MCC and MNC derived in step 1 to create a "mnc<MNC>.mcc<MCC>.3 gppnetwork.org" domain name.
3. Add the label "ims." to the beginning of the domain.

The result for this example is the home network domain name for the IMSI is 234150999999999, where:
MCC=234;
MNC=15;and
MSIN=0999999999,
This provides the home network domain name: ims.mnc015.mcc234.3gppnetwork.org. A second related example is an EPC Home Network Realm/Domain from Section 19.2 of 3 GPP TS 23.003 V9.4.0: epc.mnc015.mcc234.3gppnetwork.org.

A third derived domain name example is a Tracking Area Identity FQDN from Section 19.4.2.3 of 3 GPP TS 23.003 V9.4.0. A Tracking Area Identity (TAI) includes a Tracking Area Code (TAC), an MNC, and an MCC. In this non-limiting example, the TAC is a 16-bit integer. <TAC-high-byte> is the hexadecimal string of the most significant byte in the TAC, and <TAC-low-byte > is the hexadecimal string of the least significant byte. If there are less than 2 significant digits in <TAC-high-byte> or <TAC-low-byte >, then "0" digit(s) is(are) inserted at the left side to fill the 2 digit coding. The TAI FQDN is compiled as:
   tac-lb<TAC-low-byte>.tac-hb<TAC-high-byte>.tac.epc.mnc<MNC>.mcc<MCC>.3 gppnetwork.org.

A fourth derived domain name example is an MME Node FQDN from Section 19.4.2.4 of 3 GPP TS 23.003 V9.4.0. A Mobility Management Entity (MME) within an operator's network is identified using a MME Group ID (MMEGI) and an MME Code (MMEC). The MME node's FQDN is constructed as:
   mmec<MMEC>.mmegi<MMEGI>.mme.epc.mnc<MNC>.mcc<MCC>.3gppnetwork.org,
where <MMEC> and <MMEGI> are the hexadecimal strings of the MMEC and MMEGI. An MME pool FQDN is constructed as:
   mmegi<MMEGI>.mme.epc.mnc<MNC>.mcc<MCC>.3 gppnetwork.org.

There are problems with pre-configuring an O&M node address in a SIM, a relay node, or any radio network node so that O&M data can be transferred to each SIM, relay node, or other radio network node in advance or during integration. For example, in order to be able to retrieve an O&M node address from a DHCP server, all DHCP servers serving the radio network nodes must be configured with all of the O&M node addresses to be used for each type of radio network node. What is needed is simpler technology for radio network nodes to obtain an O&M node address. In addition, it would be desirable for that technology to handle different O&M node addresses for radio network nodes from different vendors and/or multiple tracking areas without having to configure this information into, e.g. the DHCP servers.

SUMMARY

A domain name associated with a radio network node's operator and/or maintenance (OM) node is determined based on at least part of a radio node identifier and a radio network operator identifier. The radio network node can be for example a relay node, a base station node, etc. The radio network node sends the domain name to a domain name server. In response to sending the constructed domain name, the radio network node receives from the domain server an IP address for the OM node. The radio network node then initiates a connection with the OM node using the IP address.

In an example embodiment, the part of the radio node identifier is a radio network node vendor identifier and the domain name is determined using the radio network node vendor identifier and at least part of the radio network operator identifier.

In another example embodiment, the domain name is constructed using an area identifier, non-limiting examples of which include some part or all of a tracking area identifier, a location area identifier, and a routing area identifier.

In another example embodiment, the radio network node identifier is an International Mobile Equipment Identity (IMEI) or an International Mobile Equipment Identity and Software Version Number (IMEISV) associated with the radio network node identifier and the part of the radio network node identifier is a Type Allocation Code (TAC) part of the IMEI or IMEISV.

The radio network operator identifier may be determined from a subscriber identifier associated with the radio network node. For example, the subscriber identifier may be an International Mobile Subscriber Identity (IMSI) and the determined radio network operator identifier includes a mobile network code (MNC) and a mobile country code (MCC).

The technology may be applied in situations where multiple vendors supply OM nodes. For example, a first OM node is associated with a first vendor that supplies a first radio network node and a second OM node is associated with a second vendor that supplies a second radio network node. A first domain name associated with the first OM node is determined based on a part of a radio node identifier for the first radio network node that identifies the first vendor and the radio network operator identifier. The first domain name is sent to the domain name server, and in response thereto, a first IP address for the first OM node is received. A connection is then initiated with the first OM node using the first IP address. Similarly, a second domain name associated with the second OM node is determined based on a part of a radio node identifier for the second radio network node that identifies the second vendor and the radio network operator identifier. The second domain name is sent to the domain name server, and in response thereto, a second IP address for the second OM node is received. A connection is then initiated with the second OM node using the second IP address.

The technology may be applied in situations where multiple tracking areas exist. For example, a first OM node is associated with a first tracking area and a second OM node is associated with a second tracking area. A first domain name associated with the first OM node is determined based on a part of a radio node identifier for a first radio network node located in the first tracking area identified by a first tracking area code and the radio network operator identifier. The first domain name is sent to the domain name server, and in response thereto, a first IP address for the first OM node is received. A connection is then initiated with the first OM node using the first IP address. Similarly, a second domain name associated with the second OM node is determined based on a part of a radio node identifier for the second radio network node located in the second tracking area identified by a second tracking area code and the radio network operator identifier. The second domain name is sent to the domain name server, and in response thereto, a second IP address for the second OM node is received. A connection is then initiated with the second OM node using the second IP address.

In one example embodiment, the radio network node determines the domain name itself by constructing the domain name. In another example embodiment, the radio network node determines the domain name by receiving the domain name from another node.

DETAILED DESCRIPTION

Figure 1:
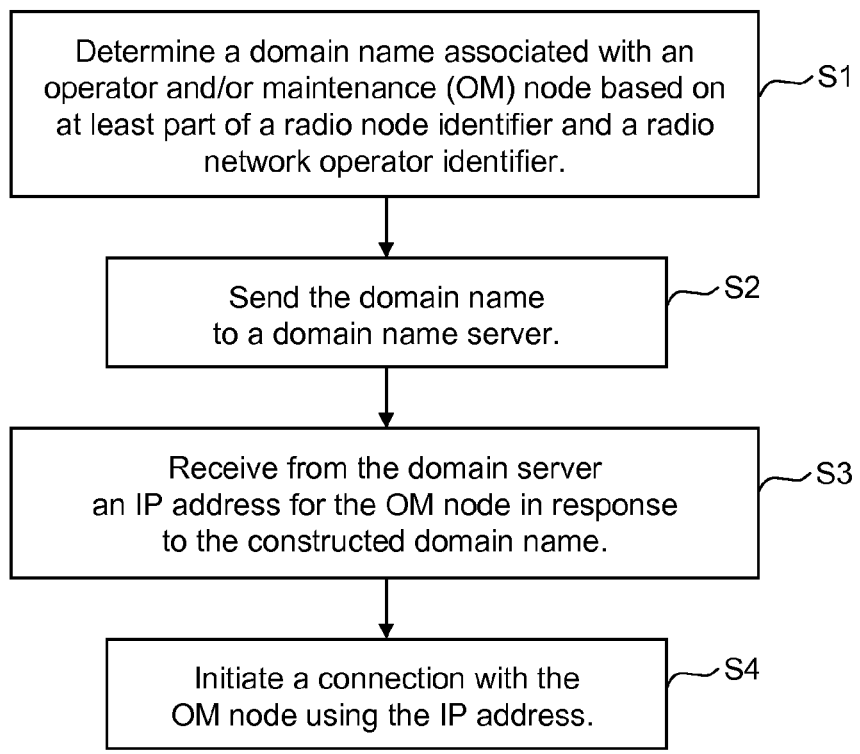
FIG. 1 is a flowchart illustrating non-limiting example procedures for determining an O&M node network address.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks may are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Nodes that communicate using the air interface have suitable radio communications circuitry. Although non-limiting example embodiments described below relate to 3 GPP-based systems, the technology may be applied to any cellular radio communications system. The examples below use a relay node as an example of a radio network node. However, the technology may be applied to radio network node other than relay nodes, e.g., a base station node, a pico-base station node, a home base station node, etc. Moreover, the terms "O&M node" and "OM node" each encompasses any addressable node that performs some sort of operation and/or maintenance function(s).

FIG. 1 is a flowchart illustrating non-limiting example procedures for determining an O&M node network address. A domain name associated with a radio network node's operator or maintenance (OM) node is determined based on at least part of a radio node identifier and a radio network operator identifier (step S1). In one non-limiting example embodiment, the part of the radio node identifier is a radio network node vendor identifier, and a radio network operator identifier is determined from a subscriber identifier associated with the radio network node. A radio network node sends the domain name to a domain name server (step S2), and in response to sending the constructed domain name, the radio network node receives from the domain server an IP address for the OM node (step S3). The radio network node then initiates a connection with the OM node using the IP address (step S4). The OM node domain name may be constructed by the radio network node itself or it may be provided to the radio network node by some other node.

In another example embodiment, at least a first OM node is associated with a first vendor that supplies a first radio network node and at least a second OM node is associated with a second vendor that supplies a second radio network nod. A first domain name associated with the first OM node is determined based on a part of a radio node identifier for the first radio network node that identifies the first vendor and the radio network operator identifier. The first radio network node sends the first domain name to the domain name server, and in response thereto, receives from the domain server a first IP address for the first OM node. The first radio network node then initiates a connection with the first OM node using the first IP address. Similarly, a second domain name associated with the second OM node is determined based on a part of a radio node identifier for the second radio network node that identifies the second vendor and the radio network operator identifier. The second radio network node sends the constructed second domain name to the domain name server, and in response thereto, receives from the domain server a second IP address for the second OM node. The second radio network node then the second radio network node initiates a connection with the second OM node using the second IP address.

In yet another example embodiment, at least a first OM node is associated with a first tracking area and at least a second OM node is associated with a second tracking area. A first domain name associated with the first OM node is determined based on a part of a radio node identifier for a first radio network node located in the first tracking area identified by the first tracking area code and on the radio network operator identifier. The first radio network node sends the first domain name to the domain name server, and in response thereto, receives from the domain server a first IP address for the first OM node. The first radio network node initiates a connection with the first OM node using the first IP address. A second domain name associated with the second OM node is determined based on a part of a radio node identifier for the second radio network node located in the second tracking area identified by the second tracking area code and on the radio network operator identifier. The second radio network node sends the constructed second domain name to the domain name server, and in response thereto, receives from the domain server a second IP address for the second OM node. The second radio network node initiates a connection with the second OM node using the second IP address.

Figure 2:
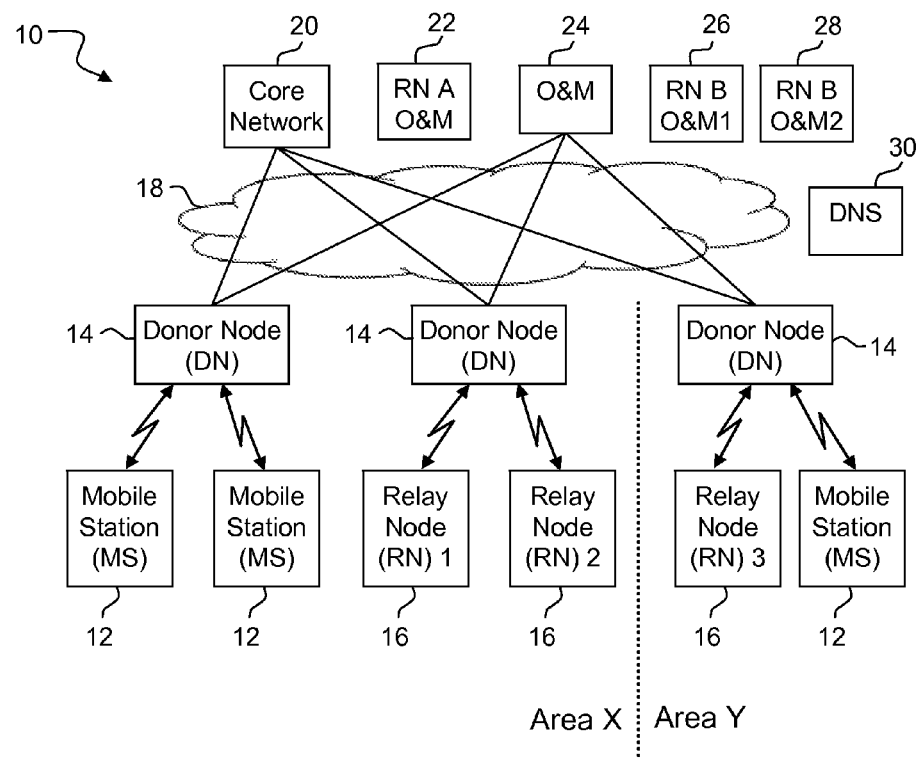
FIG. 2 is function block diagram illustrating a non-limiting example 3 GPP-type radio communications system where the technology in this application may be employed.

FIG. 2 is function block diagram illustrating a non-limiting example 3 GPP-type radio communications system 10 where the technology in this application may be employed. The system 10 includes multiple mobile stations (MS) 12 some of which communicate over the radio interface with one or more donor nodes 14 (e.g., radio base stations) and/or one or more relay nodes 16. Three example relay nodes RN1, RN2, and RN3 are shown and are associated with two different vendors A and B. The donor nodes connect through one or more networks represented as a cloud 18 to one or more domain name servers (see example DNS 30), one or more nodes in a core network 20, and to an O&M node 24. The coverage area for the system 10 is divided in this example into a tracking area X and tracking area Y. Areas X and Y may each include multiple tracking areas. A Vendor A O&M node 22 manages vendor A relay nodes (RNs) in both areas, while vendor B relay nodes are managed by two O&M nodes, one handling nodes in area X (RNB O&M1) and one handling nodes in area Y (RNB O&M2). Relay nodes RN1 and RN2 are located in a tracking area belonging to area X, and relay node RN 3 is located in a tracking area belonging to area Y. Assume in this example that none of the relay nodes is operational, and therefore, each relay node must discover its corresponding O&M node.

A relay node is similar to a mobile station because of its backhaul over the radio interface, and as a result, each relay node has an International Mobile Equipment Identity (IMEI) number, International Mobile Equipment Identity and Software Version (IMEISV) number, or similar identifier assigned to it. This may also be the case for other types of radio network nodes like low power base stations, e.g., pico-base stations, home base stations, etc. More generally, the technology in this application may also be used for radio network nodes other than relay nodes as long as identifiers are available for any operator, vendor, area, or node type. One example is when the node is equipped with UE functionality and thereby similar information is available as in the relay node case. The technology is also applicable to situations when radio network nodes are deployed such that the transport is provided by some entity other than the operator.

The IMEI is composed of the following elements (each element includes decimal digits):
   Type Allocation Code (IMEI-TAC) having a length of 8 digits;
   Serial Number (SNR) is an individual serial number uniquely identifying each equipment within the IMEI-TAC having a length of 6 digits; and
   Check Digit (CD)/Spare Digit (SD).

The IMEISV is composed of the following elements (each element includes decimal digits):
   Type Allocation Code (IMEI-TAC) having a length of 8 digits;
   Serial Number (SNR) is an individual serial number uniquely identifying each equipment within the IMEI-TAC having a length having a 6 digits; and
   Software Version Number (SVN) identifies the software version number of the mobile equipment and has a length of 2 digits.

The IMEI and IMEISV number series are specific for each node equipment vendor, and an 8-digit IMEI-Type Allocation Code (IMEI-TAC) included identifies the node equipment vendor. A vendor may be allocated one or more IMEI-TACs. By constructing a Domain Name (DN) that includes the IMEI-TAC part of the IMEI or IMEISV for the radio network node, e.g., a relay node (RN), and a network operator identifier, every radio network node can identify its associated O&M node in the correct operator's network by retrieving that O&M node's IP address from the DNS server 30 using the constructed domain name. Again, although the terms and acronyms are 3 GPP-specific, domain names may be constructed using different kinds of mobile station identifiers and/or type allocation codes.

Each constructed domain name in this example may include a Tracking Area Code (TAC) or similar code of the cell that provides backhaul to the relay node. Other examples of such area codes or area identifiers are location area identifiers, routing area identifiers, etc. The TAC may be used to direct each relay node to its corresponding O&M node serving this specific area in case there are more O&M systems serving nodes from the same vendor. The constructed domain name may also include the type of the node that needs to locate its O&M node when there are different O&M nodes from the same vendor.

Figure 3:
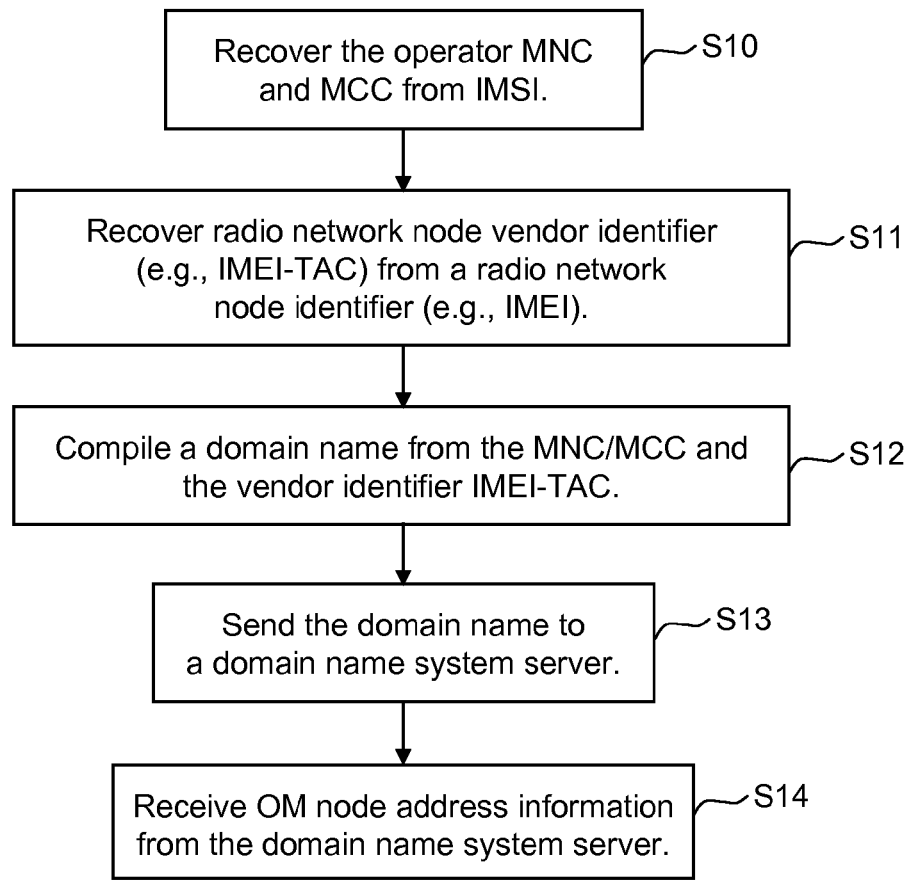
FIG. 3 is a flowchart illustrating non-limiting example procedures for determining an O&M node network address in the example 3 GPP-type radio communications system shown in FIG. 2.

FIG. 3 is a flowchart illustrating non-limiting example procedures for determining an O&M node network address in the example 3 GPP-type radio communications system shown in FIG. 2. In step S10, the operator identifiers MNC and MCC are recovered from the IMSI. A radio network node identifier like the IMEI-TAC is recovered from the IMEI or IMEISV associated with the radio network node (step S11). From the MNC, MCC, and IMEI-TAC, an O&M node domain name is constructed or compiled (step S12) and sent to the DNS server 30 (step S13). The DNS server 30 sends the radio network node's corresponding O&M node address (step S14) which is used by the radio network node to communicate with that O&M node and obtain configuration information, etc.

The O&M node domain name may, for example, be constructed to comply with 3 GPP standards in TS 23.003 by introducing "oam" as a sub-domain to 3 gppnetwork.org, yielding oam.mnc<MNC>.mcc<MCC>.3 gppnetwork.org. In addition, the O&M node domain name may also include the radio access technology and node type. Non-limiting examples include:
   an EUTRAN RAT indication such as:eutran.oam.mnc<MNC>.mcc<MCC>.3 gppnetwork.org
   an UTRAN RAT indication such as:utran.oam.mnc<MNC>.mcc<MCC>.3 gppnetwork.org
   Relay node indication such as: rn.oam.mnc<MNC>.mcc<MCC>.3 gppnetwork.org
   Pico node indication such as: pn.oam.mnc<MNC>.mcc<MCC>.3 gppnetwork.org
   EUTRAN relay node indication such as: eutran-rn.oam.mnc<MNC>.mcc<MCC>.3 gppnetwork.org "Literals" used to indicate radio access technology and/or node type may be different, and the order may be altered.

The O&M domain name also includes a part of the radio node identifier that identifies the vendor. In a case where both the radio access type and node type are indicated in the domain name, a domain name example is: imei-tac<IMEI-TAC>.eutran-rn.oam.mnc<MNC>.mcc<MCC>.3 gppnetwork.org There may be multiple O&M systems in the operator network managing the nodes from a specific vendor. Therefore, different radio network nodes from the same vendor need to be directed to different O&M IP addresses. One way to assign nodes to O&M systems is via tracking area codes. Then, all tracking area codes in a first set of tracking area codes are associated to a first O&M node, while tracking area codes in a second set of tracking area codes are associated to a second O&M node. The O&M node association can be geographical, where the first set of tracking area codes are assigned to nodes in a geographical area X and the second set of tracking area codes are assigned to nodes in a geographical area Y. Then, all tracking area codes in the first set are associated to the IP address of the first O&M node in the DNS, and all tracking area codes in the second set are associated to the IP address of the second O&M node in the DNS. In the case where both the radio access type and node type are indicated in the domain name, a domain name example is: tac-lb<TAC-low-byte>.tac-hb<TAC-high-byte>.imei-tac<IMEI-TAC>.eutran-rn.oam.mnc<MNC>.mcc<MCC>.3 gppnetwork.org.

The radio node may include the tracking area information in the domain name even when only one O&M node manages all radio network nodes from a specific vendor. In a case where the DNS is not configured with an associated IP address for the domain name and no IP address can be returned to the radio node, the radio node may lookup a shorter domain name by removing literals, e.g., from the left. This means that if the radio network node queries the DNS using the domain name: tac-lb<TAC-low-byte>.tac-hb<TAC-high-byte>.imei-tac<IMEI-TAC>eutran-rn.oam.mnc<MNC>.mcc<MCC>.3 gppnetwork.org, but gets no IP address in response, the radio network node might build a shorter domain name like imei-tac<IMEI-TAC>.eutran-rn.oam.mnc<MNC>.mcc<MCC>.3 gppnetwork.org and send that to the domain name server for an IP address.

IP addresses may be configured based on the high-byte of TAC, in which case, the radio network node may build and send a domain name like tac-hb<TAC-high-byte>.imei-tac<IMEI-TAC>eutran-rn.oam.mnc<MNC>.mcc<MCC>.3 gppnetwork.org, and receive an IP address as response.

Moreover, the radio network node type may also be part of the domain name. Also, other mechanisms to identify the vendor may be used such as for example a dedicated vendor identifier for nodes without an IMEI or IMEISV.

Figure 4:
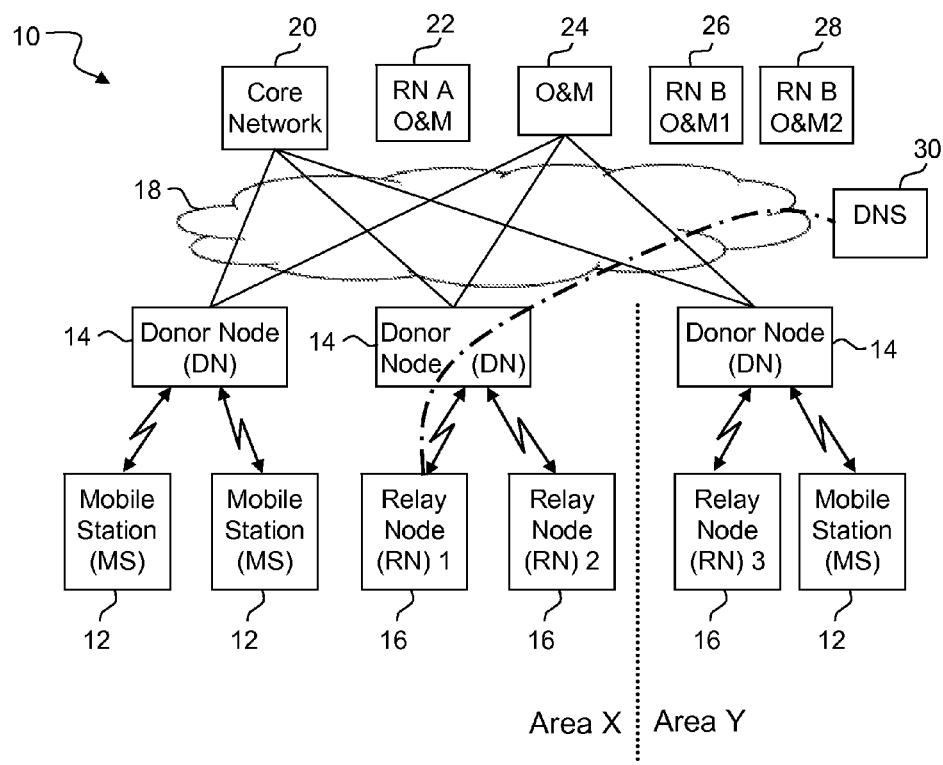
FIG. 4 is function block diagram for the non-limiting example 3 GPP-type radio communications system in FIG. 2 showing a communication exchange between a first relay node RN1 and a DNS server.
Figure 5:
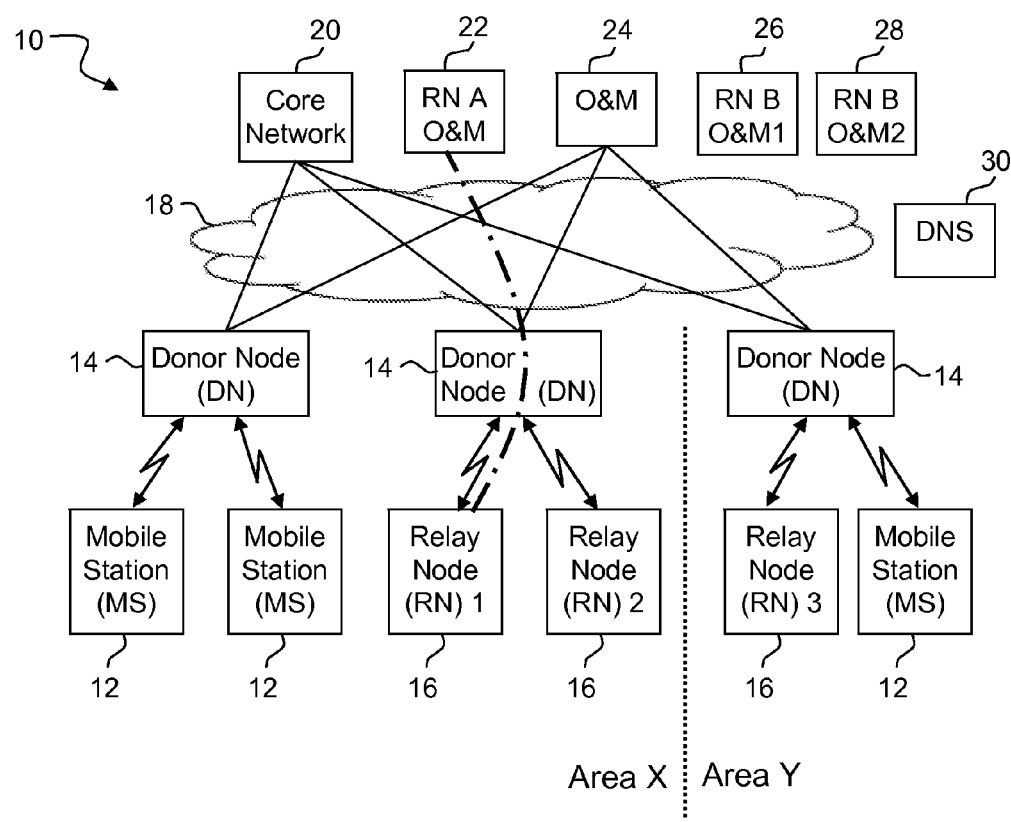
FIG. 5 is function block diagram for the non-limiting example 3 GPP-type radio communications system in FIG. 2 showing an initial communication from a first relay node RN1 addressed to its O&M node.

FIG. 4 is function block diagram for the non-limiting example 3 GPP-type radio communications system in FIG. 2 showing a communication exchange between a first relay node RN1 and a DNS server. FIG. 5 is function block diagram for the non-limiting example 3 GPP-type radio communications system in FIG. 2 showing an initial communication from a first relay node RN1 addressed to its O&M node. Here, the relay node RN1 is assigned an IMSI and IMEI or IMEISV and is provided by vendor A, which is identified with a vendor code 00000001. The network operator MNC=015 and MCC=234 are determined from RN1's IMSI, and the IMEI-TAC is extracted from the IMEI or IMEISV. The relay node RN1 compiles the domain name: imei-tac00000001.eutran-rn.oam.mnc015.mcc234.3gppnetwork.org, and sends it to the DNS server, which responds with the IP address of the O&M node associated with vendor A, which is labeled RN A O&M in FIGS. 4 and 5.

Figure 6:
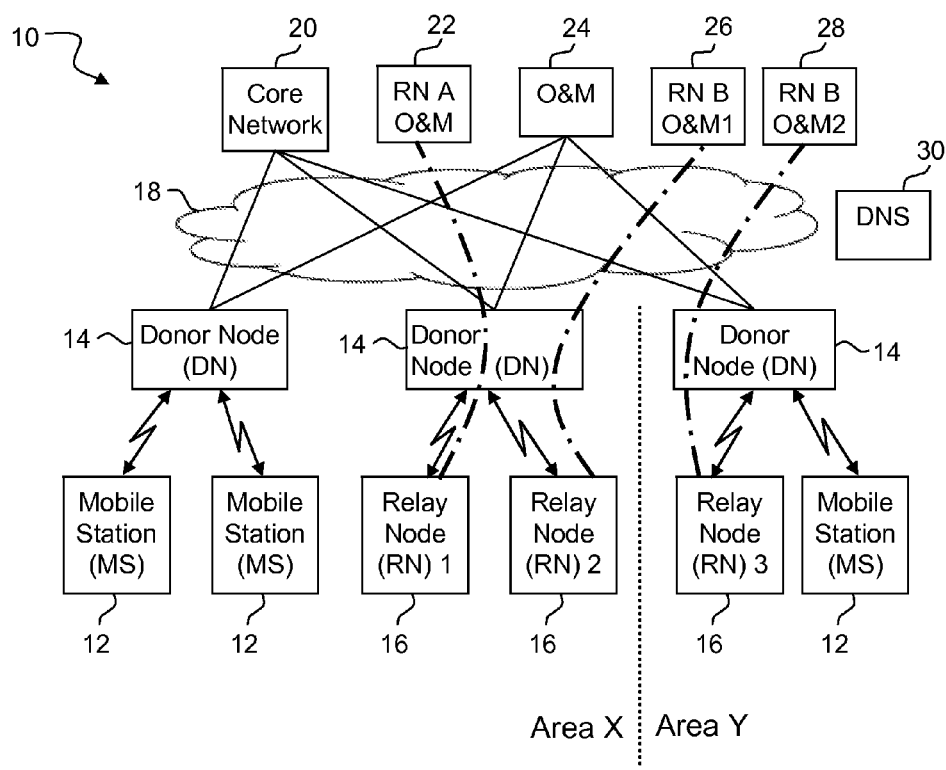
FIG. 6 is function block diagram for the non-limiting example 3 GPP-type radio communications system in FIG. 2 showing an initial communication from a first relay node RN1 addressed to its O&M node, a second relay node RN1 addressed to its different O&M node, and a third relay node RN1 addressed to its different O&M node.

FIG. 6 is function block diagram for the non-limiting example 3 GPP-type radio communications system in FIG. 2 showing an initial communication from a first relay node RN1 addressed to its O&M node, a second relay node RN2 addressed to its different O&M node, and a third relay node RN1 addressed to its different O&M node. The process for relay node RN1 from vendor A was just described. The relay node RN2 from vendor B with vendor code 00000002 is located in a tracking area belonging to area X with a tracking area code 512 in decimal representation, which is 0x0200 in hexadecimal representation. This means that TAC-high-byte is 02 and TAC-low-byte is 00. The relay node RN2 can compile the domain name: tac-lb00.tac-hb02.imei-tac00000002.eutran-rn.oam.mnc015.mcc234.3gppnetwork.org and send it to the DNS server. Similarly, RN3 from the same vendor B is located in a different tracking area belonging to area Y with a tracking area code 768 in decimal representation, which is 0x0300 in hexadecimal representation. Hence, the TAC-high-byte is 03, and the TAC-low-byte is 00. The relay node RN3 therefore compiles the following domain name to be sent to the DNS server: tac-lb00.tac-hb03.imei-tac00000002.eutran-rn.oam.mnc015.mcc234.3gppnetwork.org. The former domain name is mapped to the IP address of the RN B O&M1, serving area X, while the latter domain name is mapped to the IP address of RN B O&M2, serving Area Y.

Figure 7:
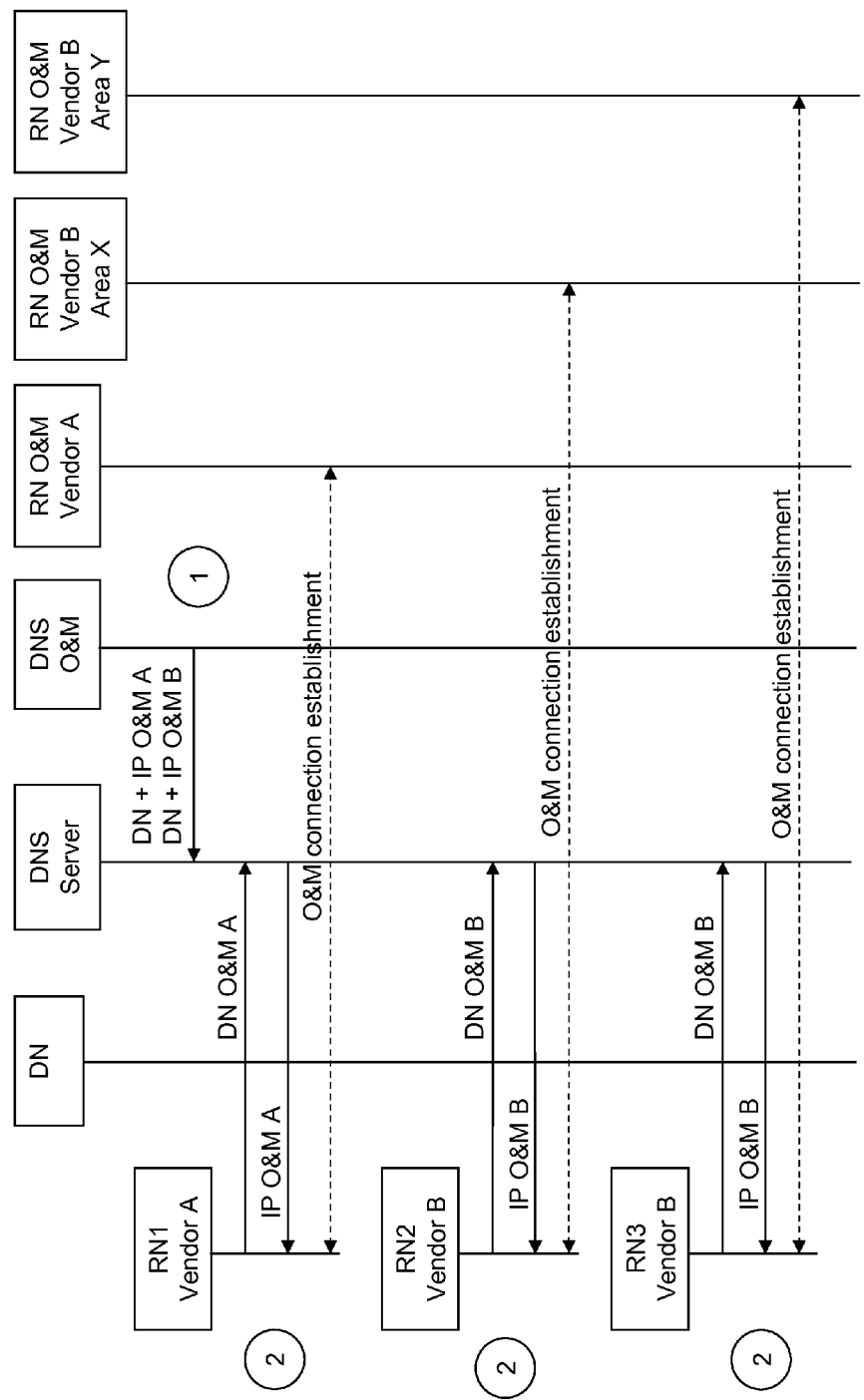
FIG. 7 is a non-limiting example signaling diagram for the examples shown in FIGS. 4-6.

FIG. 7 is a non-limiting example signaling diagram for the examples shown in FIGS. 4-6. For one operator network, the DNS server is configured with domain names and IP addresses for each combination of vendor and area. Each relay node compiles the domain name for its O&M node, sends the domain name to a DNS server, receives the IP address of the O&M node in return, and establishes a connection to the O&M node.

In another non-limiting example embodiment, the domain name may be generated based on the subscription identity information in the IMSI: <IMSI>=<MCC><MNC><MSIN higher><MSIN lower>. For example, relay nodes from the same vendor may be assigned reserved set of IMSIs with the same <MSIN higher> (or same <MSIN lower> with corresponding modifications below). Then a domain name that complies with TS 23.003 may be formulated as: msinhigh<MSIN higher>.oam.mnc<MNC>.mcc<MCC>.3 gppnetwork.org. This domain name may be extended (if desired or needed) with node type, tracking area, RAT indicator, etc.

In yet another non-limiting example embodiment, the MME recovers the IMEI or IMEISV and the IMSI from the RN and provides that information to a node responsible to derive a RN O&M domain name, or route the RN O&M traffic to the RN O&M.

Figure 8:
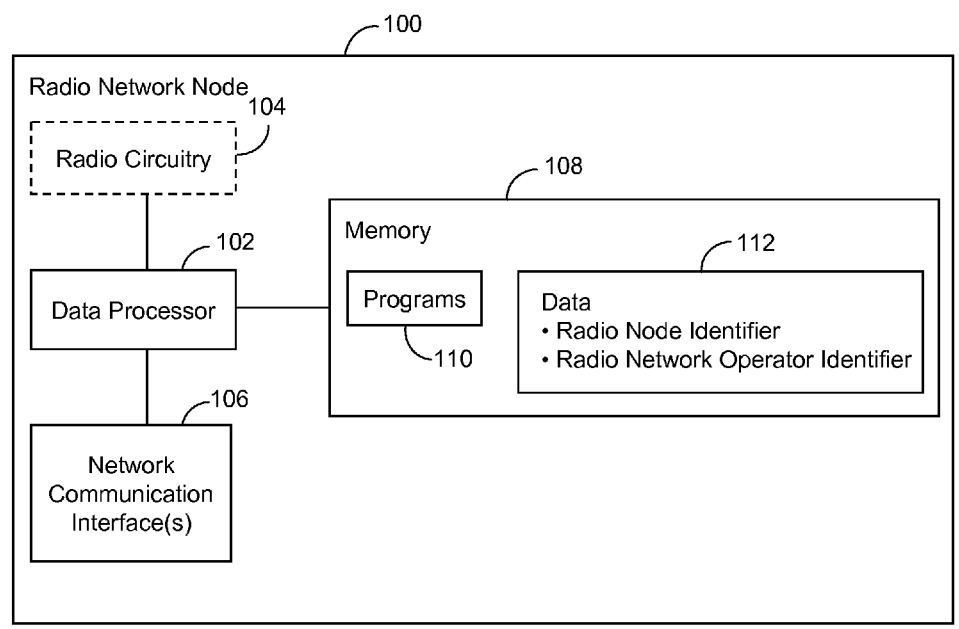
FIG. 8 is a non-limiting example function block diagram of a radio network node.

FIG. 8 is a non-limiting example function block diagram of a network node 100 that may be used to implement the above operations for one or more of the node in the figures. A data processor 102 controls overall operation of the network node. The network node 100 may be a radio network node (some sort of base station or access point) and thus include radio communications circuitry 104. Alternatively or additionally, the network node 100 may be a core network or other network node in which case radio circuitry may not be needed unless that node communicates wirelessly. The data processor 102 connects to one or more network communication interface(s) 106 and to memory 108. The memory 108 includes program instructions 110 and data 112. For example, data 112 includes radio node identifier information (IMEI-TAC, etc.) and radio network operator identification data (MNC, MCC, etc.)

There are many advantages to the technology described including, for example, the fact that radio network node configuration effort is significantly lowered. Instead of configuring O&M system addresses in all relay nodes or SIM cards or even all radio network nodes, or alternatively in all reachable DHCP servers in the network, one domain name and one IP address per node vendor may be configured in one DNS server. The technology can distinguish between hardware vendors in domain names and use identifiers for a group of hardware entities when generating domain names. As a result, an operator does not need to manually configure all DHCP servers. Instead, nodes from different vendors can automatically discover their respective appropriate O&M node. Adding a new node vendor then only requires a minor DNS entry addition instead of a cumbersome node reconfiguration.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for constructing a domain name, comprising:
constructing, by a radio network node, a domain name of an operator or maintenance (OM) node based on at least part of a radio node identifier identifying the radio network node and a radio network operator identifier;
sending by the radio network node, the constructed domain name to a domain name server;
in response to sending the constructed domain name, receiving, by the radio network node and from the domain server, an IP address for the OM node; and
initiating, by the radio network node, a connection with the OM node using the IP address.

2. The method in claim 1, wherein the part of the radio node identifier is a radio network node vendor identifier and the domain name is constructed using the radio network node vendor identifier and at least part of the radio network operator identifier.

3. The method in claim 2, wherein the domain name further comprises area identifier information.

4. The method in claim 3, wherein the area identifier information is a tracking area identifier, location area identifier, or routing area identifier.

5. The method in claim 1, wherein the radio network node identifier is an International Mobile Equipment Identity (IMEI) or an International Mobile Equipment Identity and Software Version Number (IMEISV) associated with the radio network node identifier and the part of the radio network node identifier is a Type Allocation Code (TAC) part of the IMEI or IMEISV.

6. The method in claim 1, further comprising determining a radio network operator identifier from a subscriber identifier associated with the radio network node.

7. The method in claim 6, wherein the subscriber identifier is an International Mobile Subscriber Identity (IMSI) and the determined radio network operator identifier includes a mobile network code (MNC) and a mobile country code (MCC).

8. The method in claim 1, wherein the radio network node is a relay node.

9. The method in claim 1, wherein the radio network node is a base station node.

10. The method in claim 1, wherein the constructing step is performed by the radio network node.

11. The method in claim 1, wherein the constructing step is performed by a node different from the radio network node.

12. The method in claim 1, wherein at least a first OM node is associated with a first vendor that supplies a first radio network node and at least a second OM node is associated with a second vendor that supplies a second radio network node, the method further comprising:
constructing a first domain name associated with the first OM node based on a part of a radio node identifier for the first radio network node that identifies the first vendor and the radio network operator identifier;
sending the constructed first domain name to the domain name server;
in response to sending the first constructed domain name, receiving from the domain server a first IP address for the first OM node;
the first radio network node initiating a connection with the first OM node using the first IP address;
constructing a second domain name associated with the second OM node based on a part of a radio node identifier for the second radio network node that identifies the second vendor and the radio network operator identifier;
sending the constructed second domain name to the domain name server;
in response to sending the second constructed domain name, receiving from the domain server a second IP address for the second OM node; and
the second radio network node initiating a connection with the second OM node using the second IP address.

13. The method in claim 1, wherein at least a first OM node is associated with a first tracking area and at least a second OM node is associated with a second tracking area, the method further comprising:
constructing a first domain name associated with the first OM node based on a part of a radio node identifier for a first radio network node located in the first tracking area identified by a first tracking area code and the radio network operator identifier;
sending the constructed first domain name to the domain name server;
in response to sending the first constructed domain name, receiving from the domain server a first IP address for the first OM node;
the first radio network node initiating a connection with the first OM node using the first IP address;
constructing a second domain name associated with the second OM node based on a part of a radio node identifier for the second radio network node located in the second tracking area identified by a second tracking area code and the radio network operator identifier;
sending the constructed second domain name to the domain name server;
in response to sending the second constructed domain name, receiving from the domain server a second IP address for the second OM node; and
the second radio network node initiating a connection with the second OM node using the second IP address.

14. A radio network node, comprising:
a data processor configured to determine a domain name of an operations or maintenance (OM) node that is based on at least part of a radio node identifier and a radio network operator identifier,
domain name server interface circuitry configured to send the domain name to a domain name server and to receive in response thereto from the domain server an IP address for the OM node; and
communications circuitry configured to initiate a connection with the OM node using the IP address.

15. The radio network node in claim 14, wherein the part of the radio node identifier is a radio network node vendor identifier and the domain name is determined using the radio network node vendor identifier and at least part of the radio network operator identifier.

16. The radio network node in claim 14, wherein the domain name includes area indicator information.

17. The radio network node in claim 16, wherein the area indicator information is a tracking area identifier, location area identifier, or routing area identifier.

18. The radio network node in claim 14, wherein the radio network node identifier is an International Mobile Equipment Identity (IMEI) or a International Mobile Equipment Identity and Software Version Number (IMEISV) associated with the radio network node identifier and the part of the radio network node identifier is a Type Allocation Code (TAC) part of the IMEI or IMEISV.

19. The radio network node in claim 14, wherein the data processor is configured to determine a radio network operator identifier from a subscriber identifier associated with the radio network node.

20. The radio network node in claim 19, wherein the subscriber identifier is an International Mobile Subscriber Identity (IMSI) and the determined radio network operator identifier includes a mobile network code (MNC) and a mobile country code (MCC).

21. The radio network node in claim 14, wherein the radio network node is a relay node.

22. The radio network node in claim 14, wherein the radio network node is a base station node.

23. The radio network node in claim 14, wherein at least a first OM node is associated with a first vendor that supplies a first radio network node and at least a second OM node is associated with a second vendor that supplies a second radio network node, and wherein:

the data processor is configured to determine a first domain name associated with the first OM node that is based on a part of a radio node identifier for the first radio network node that identifies the first vendor and the radio network operator identifier;

the domain name server interface circuitry is configured to send the first domain name to the domain name server, and in response thereto, receive from the domain server a first IP address for the first OM node;

the communications circuitry is configured to initiate a connection with the first OM node using the first IP address;

the data processor is configured to determine a second domain name associated with the second OM node that is based on a part of a radio node identifier for the second radio network node that identifies the second vendor and the radio network operator identifier;

the domain name server interface circuitry is configured to send the second domain name to the domain name server, and in response thereto, receive from the domain server a second IP address for the second OM node; and the communications circuitry is configured to initiate a connection with the second OM node using the second IP address.

24. The radio network node in claim 14, wherein at least a first OM node is associated with a first tracking area and at least a second OM node is associated with a second tracking area, and wherein:

the data processor is configured to determine a first domain name associated with the first OM node that is based on a part of a radio node identifier for a first radio network node located in the first tracking area identified by a first tracking area code and the radio network operator identifier;

the domain name server interface circuitry is configured to send the first domain name to the domain name server, and in response thereto, receive from the domain server a first IP address for the first OM node;

the communications circuitry is configured to initiate a connection with the first OM node using the first IP address;

the data processor is configured to determine a second domain name associated with the second OM node that is based on a part of a radio node identifier for the second radio network node located in the second tracking area identified by a second tracking area code and the radio network operator identifier;

the domain name server interface circuitry is configured to send the second domain name to the domain name server, and in response thereto, receive from the domain server a second IP address for the second OM node; and the communications circuitry is configured to initiate a connection with the second OM node using the second IP address.

25. The radio network node in claim 14, wherein the data processor is configured to determine the domain name by constructing the domain name.

26. The radio network node in claim 14, wherein the data processor is configured to determine the domain name by receiving the domain name from another node.

* * * * *